(No Model.)
T. F. McGEE & E. J. McCARTY.
CLUTCH COUPLING.
No. 528,012. Patented Oct. 23, 1894.
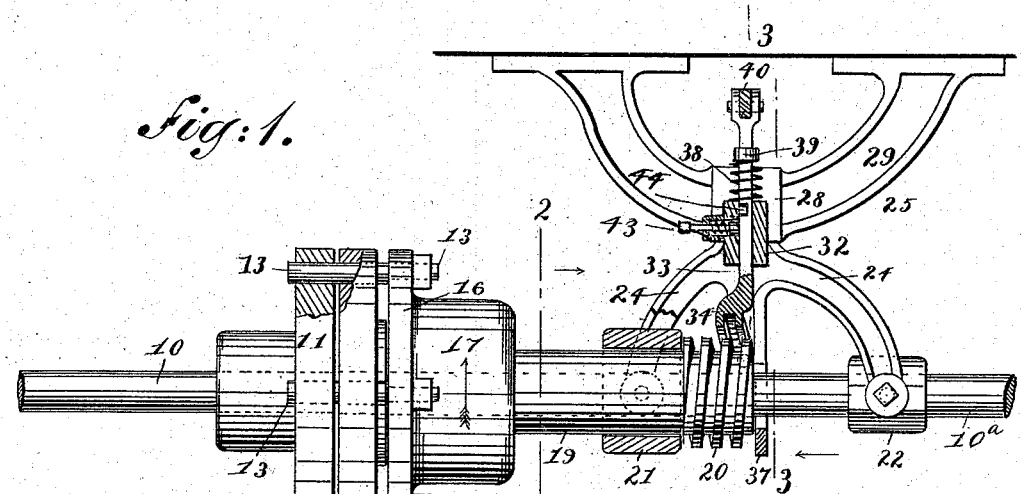
Fig. 1.
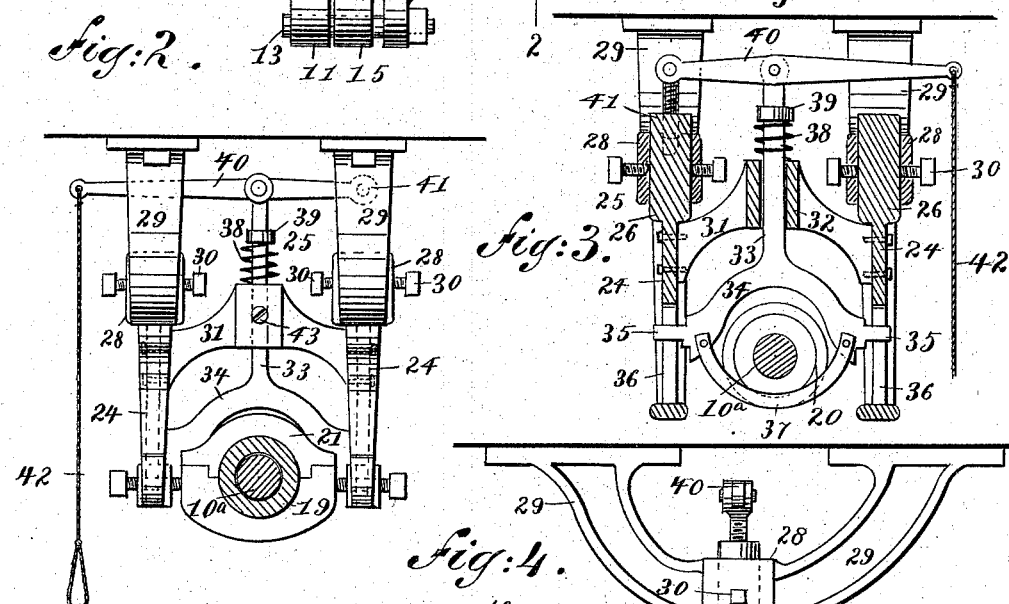
Fig. 2.
Fig. 3.
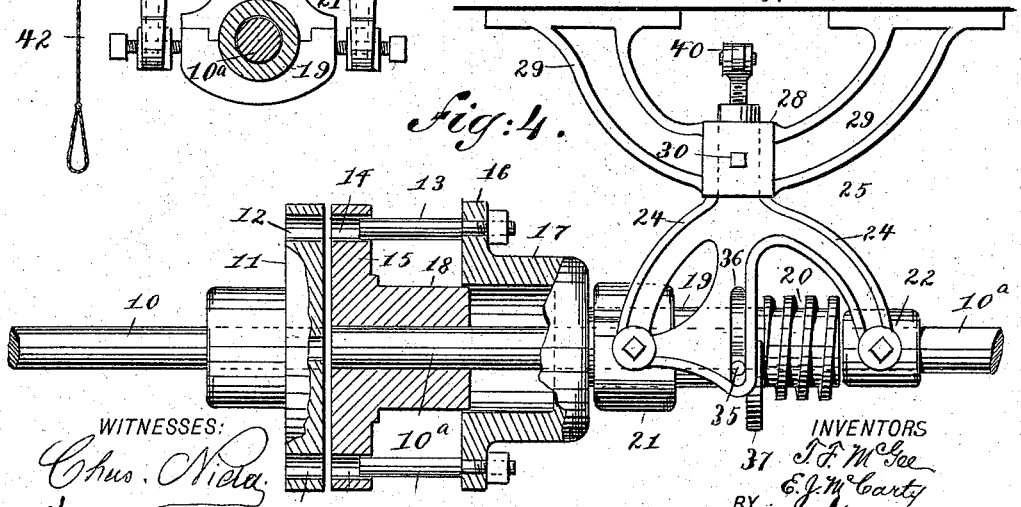
Fig. 4.
WITNESSES:
Chas. Niela
W. P. Hutchinson
INVENTORS
T. F. McGee
E. J. McCarty
BY Munn & Co.
ATTORNEYS.

UNITED STATES PATENT OFFICE.

THOMAS F. McGEE AND EUGENE J. McCARTY, OF CLINTON, MASSACHUSETTS.

CLUTCH-COUPLING.

SPECIFICATION forming part of Letters Patent No. 528,012, dated October 23, 1894.

Application filed August 4, 1894. Serial No. 519,468. (No model.)

*To all whom it may concern:*

Be it known that we, THOMAS F. McGEE and EUGENE J. McCARTY, of Clinton, in the county of Worcester and State of Massachusetts, have invented a new and Improved Clutch-Coupling, of which the following is a full, clear, and exact description.

Our invention relates to improvements in that class of couplings which are adapted to connect sections of shafting which abut end to end; and the object of our invention is to produce a coupling which will hold two adjacent sections of shafting so firmly together that the shaft will be practically a continuous shaft, and also to provide means whereby the two parts of the coupling may be instantly separated when necessary.

A further object of our invention is to produce a coupling which is simple, cheap and strong and which, while set in motion by hand, is operated by the power of the shaft carrying it, so that there is no question about its working positively when desired.

The coupling is intended for use on the main shaft of a factory, or a coupling may be placed at the point where the shaft enters a room of a building, a coupling being provided for each room or at more frequent intervals if necessary, and thus, in case of an accident, at any point, the power may be instantly shut off by working the coupling, or if the machinery in a certain room is not to be used, the power may be easily shut off from the room by means of the aforesaid coupling.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a broken side elevation, partly in longitudinal section, of our improved coupling. Fig. 2 is a cross section on the line 2—2 of Fig. 1. Fig. 3 is a cross section on the line 3—3 of Fig. 1; and Fig. 4 is a broken longitudinal section, showing the parts of the coupling detached.

The coupling is adapted to connect abutting shafts, as 10 and $10^a$, and to one of these shafts is rigidly secured, in any usual way, a flange 11 which is provided with holes 12 to receive the coupling pins 13 which slide through holes 14 in the flange 15, which is secured to the shaft $10^a$, and the two flanges 11 and 15 are brought face to face, so that when the coupling pins 13 are thrust through both holes 12 and 14, the two flanges and consequently the two shafts are rigidly connected, thus making practically one continuous shaft, but when the pins are pulled out of the holes 12, as in Fig. 4, one of the shafts remains stationary.

The coupling pins 13 are secured to a flange 16 which has a hollow hub 17 sliding over the hub 18 of the flange 15, which hub 18 serves as a guide for the flange 16, and the hub 17 has at one end a sleeve 19 which slides on the shaft $10^a$ and terminates in a screw 20. The sleeve 19 and the shaft $10^a$ are supported in boxes 21 and 22 which are hung in the lower ends of the brackets 24, which form the lower end of the hanger 25, these brackets 24 having, at their upper ends, slides or shanks 26 which move in boxes 28 on the lower ends of the brackets 29, which form the top portion of the hanger and are adapted to be secured to suitable overhead supports, and the brackets 24 are held at the right height by means of set screws 30.

The opposite brackets 24 are connected by a cross arm 31 in which is a box 32 which should be made in two parts, and sliding vertically in this box is the shank 33 of the clutch blade 34, which is adapted to engage the screw 20 and which has end studs 35 sliding in vertical slots 36 in the brackets 24, thus guiding and supporting the clutch blade 34. A curved guide 37 extends beneath the screw and is secured to the clutch blade 34, and when the coupling is in the position shown in Fig. 1 the guide 37 is held up behind the screw so as to prevent the same from working. The clutch blade is normally raised out of contact with the screw by a spring 38 which encircles the shank 33 above the box 32 and presses against a collar 39 on the shank. The upper end of the shank 33 is pivoted to a transverse lever 40, which is fulcrumed on one side of the hanger, as shown at 41, and extends across the hanger and projects from the opposite side, where it is provided with a pull cord 42 which extends downward to a point where it may be conveniently grasped.

In the box 32 is a spring pin 43 which engages a groove 44 in the shank 33 when the latter is pushed down, and thus the blade 34 is held in engagement with the screw, even though the pressure on the lever 40 be removed.

The clutch is intended to separate the two shafts by power, but must be reset by hand, and consequently the pitch of the screw 20 must be such in relation to the rotation of the shaft 10ᵃ as to cause the screw and flange 16, with which it is connected, to be retracted when the clutch blade 34 is forced downward into engagement with the screw, thus pulling out the pins 13 and opening the coupling. It will be understood that the lever 40 may be operated from distant points by suitably connecting it with pull wires or cords, and that it may also be operated from overhead by connecting a push rod to it.

When the clutch is closed so as to hold the sections of the shaft rigidly together, the parts are in the position shown in Fig. 1, with the pins 13 projecting through the flange 11, with the clutch blade 34 held above the screw 20, and with the guide 37 behind the screw so as to prevent any possible movement thereof. If now it is desired to quickly separate the two shafts so as to stop the power of one of them, the lever 40 is simply pulled down, thus carrying down the blade 34 and forcing it into engagement with the screw 20, which downward movement of the clutch blade carries down the guide 37 so as to throw it out of the way of the screw. As soon as the screw engages the clutch blade it is forced backward into the position shown in Fig. 4, thus pulling back the flange 16 and withdrawing the pins 13 from the flange 11, thereby opening the coupling and completely separating the two shaft sections.

Having thus described our invention, we claim as new and desire to secure by Letters Patent—

1. The combination, with the abutting shafts, of perforated flanges secured to the two shafts and arranged opposite each other, a third flange held to slide on the shafts and provided with pins to enter the perforations of the other flanges, and a screw mechanism for moving the pin flange, substantially as described.

2. The combination, with the abutting shafts, of the meeting perforated flanges rigidly secured to the two shafts, a third flange sliding on one of the shafts and provided with pins to enter the holes of the other two flanges, a screw sleeve on the third flange, and a clutch blade held in a stationary support and adapted to engage the screw, substantially as described.

3. The combination, with the two adjacent shafts, of the perforated flanges secured to the shafts and placed face to face, a third flange held to slide on the hub of one of the perforated flanges and provided with coupling pins to enter the holes of the meeting flanges, a screw connected with the pin-carrying flange, a hanger to support the screw and its carrying shaft, and a clutch blade movable in the hanger and adapted to engage the screw, substantially as described.

4. The combination, of the abutting shafts, the meeting perforated flanges secured to the shafts, the third flange provided with pins to enter the holes in the meeting flanges and with a sleeve sliding on one of the shafts, a screw on the end of the sleeve, a hanger supporting the sleeve and its shaft, and a slidable clutch blade mounted in the hanger and adapted to engage the screw, substantially as described.

5. The combination, with the abutting shafts, the meeting perforated flanges secured to the shafts, and the third flange sliding on one of the shafts and provided with pins to enter the holes of the perforated flanges, of a sleeve on the third flange having a screw thereon, a hanger supporting the sleeve and its shaft, a spring-pressed clutch blade mounted in the hanger and adapted to engage the screw, and a guide secured to the clutch blade and adapted to abut with the end of the screw, substantially as described.

6. The combination, with the abutting shafts, the perforated flanges and the third flange having pins to engage the holes of the perforated flanges, of the sleeve and screw connected with the third flange, the hanger supporting the sleeve and its shaft, the spring-pressed clutch blade held to slide in guides in the hanger, and a lever to work the clutch blade, substantially as described.

THOMAS F. McGEE.
EUGENE J. McCARTY.

Witnesses:
WILLIAM F. HEAGNEY,
JOHN W. McNAMARA.